United States Patent
Fletcher et al.

(10) Patent No.: US 11,055,153 B2
(45) Date of Patent: *Jul. 6, 2021

(54) QUANTIFICATION OF COMPUTE PERFORMANCE ACROSS MULTIPLE INDEPENDENTLY EXECUTED MICROSERVICES WITH A STATE MACHINE SUPPORTED WORKFLOW GRAPH

(71) Applicant: Microsoft Technology Licensing, LLC, Redmond, WA (US)

(72) Inventors: James Fletcher, Kirkland, WA (US); Robert Franz Hain, Redmond, WA (US); Kelly Michael Smith, Seattle, WA (US); Isaac Matichuk, Lynnwood, WA (US); Jared James Gohr, Seattle, WA (US); Curtis Todd Johnson, Renton, WA (US); Michael Dennis Schueller, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,359

(22) Filed: Mar. 8, 2020

(65) Prior Publication Data
US 2020/0210252 A1    Jul. 2, 2020

Related U.S. Application Data

(63) Continuation of application No. 15/953,449, filed on Apr. 14, 2018, now Pat. No. 10,585,723.

(51) Int. Cl.
*G06F 9/54* (2006.01)

(52) U.S. Cl.
CPC .................................. *G06F 9/542* (2013.01)

(58) Field of Classification Search
None
See application file for complete search history.

(56) References Cited

U.S. PATENT DOCUMENTS

2017/0075744 A1*  3/2017  Deshpande

\* cited by examiner

*Primary Examiner* — Syed A Roni
(74) *Attorney, Agent, or Firm* — Watson Patents, PLC; Vladan M. Vasiljevic

(57) ABSTRACT

A bipartite workflow graph, representing an understanding of an overall service, comprises two different graph elements: entities and processes and each individual microservice defines their logical constructs as either an entity or a process in accordance with a universal schema. Notifications from such microservices conform to the universal schema, thereby enabling microservices to individually change how they operate internally, without affecting an understanding of the overall system as represented by the workflow graph. Each graph element has its state maintained by a separately addressable execution unit executing a state machine, which can be individually updated based on information received from the microservices. Changes to the workflow graph are logged and an insight engine monitors such a log to insert insight markers in accordance with predefined events, thereby enabling the collection of metrics on a service wide basis and across multiple microservices.

20 Claims, 8 Drawing Sheets

QUANTIFICATION OF COMPUTE PERFORMANCE ACROSS MULTIPLE INDEPENDENTLY EXECUTED MICROSERVICES WITH A STATE MACHINE SUPPORTED WORKFLOW GRAPH

CROSS-REFERENCE TO RELATED APPLICATIONS

This application claims the benefit of, and priority to, U.S. patent application Ser. No. 15/953,449, now U.S. Pat. No. 10,585,723, filed on Apr. 14, 2018, and entitled "Quantification Of Compute Performance Across Multiple Independently Executed Microservices With A State Machine Supported Workflow Graph", which application is expressly incorporated herein by reference in its entirety.

BACKGROUND

A microservice design architecture is based on design philosophy that posits that it is easier to design many individual and independent microservices that each perform a single task, or a single subset of tasks, than it is to design a large monolithic service that is responsible for performing multiple disparate tasks. Consequently, in microservice design architecture, multiple discrete functions that are likely to be utilized together can be implemented by multiple different and independent teams of programmers. Such division can introduce difficulties when attempting to monitor the design and performance of an overall service comprised of many such microservices.

One mechanism for attempting to monitor an overall service comprised of such microservices is based on a siloed approach, whereby each microservice is individually understood within its own service boundaries, including an understanding of the data or functionality that such a microservice will consume and the data or functionality that such a microservice will output. Overall understanding of the service, therefore, requires translating between the constructs defined within each individual microservice. Moreover, because each individual micro service is independently understood, it is only the microservices directly providing data or functionality to such a microservice, or the micro services directly consuming data functionality from such a micro service that are known. A multi-hop understanding of the overall service cannot be known. A crawler mechanism can be utilized to collect information from each individual microservice and piece together an overall understanding based on information from each individual microservice regarding the execution context of an individual microservice. Such crawler mechanism requires that the crawler be informed of any changes to the individual microservices because otherwise those changes will nullify any overall understanding pieced together by the crawler.

Yet another alternative mechanism requires each individual microservice to identify data exchanged with other microservices with unique identifiers, or tokens. But such a mechanism requires that each microservice rigorously pass such tokens to each subsequent microservice, since the failure of any one microservice to properly pass a token can affect all downstream microservices. The passing of tokens can also be unwieldy when multiple different microservices pass the same token from a previously forked execution context into a single receiving microservice, thereby joining back the previously forked execution context. Existing approaches, therefore, either create a linear chain of tokens, such as a linked list, or a tree of tokens, such as call stacks underneath a chain of tokens.

SUMMARY

A bipartite workflow graph, representing an understanding of an overall service, can comprise two different graph elements: "processes", which can be logical constructs that perform actions, and "entitles", which can be logical constructs that encompass either the data or functionality consumed by a process or the data or functionality generated by a process and each individual microservice can be allowed to define any of their logical constructs as either an entity or a process in accordance with a universal schema. Notifications from such microservices can conform to the universal schema, thereby enabling microservices to individually change how they operate internally, without affecting an understanding of the overall system as represented by the workflow graph. Each graph element can have its state maintained by a separately addressable execution unit executing a state machine, which can be individually updated based on information received from the microservices. Changes to the workflow graph can be logged and an insight engine can monitor such a log to insert insight markers in accordance with predefined events, thereby enabling the collection of metrics on a service wide basis and across multiple microservices. Metrics between start and end insight markers, such as an elapsed time between the start marker and the end marker, can be collected, including collected in real time, and can be logged for subsequent analysis, as well as utilized to trigger real-time notifications. Additionally, elapsed time since a start marker can be monitored and notifications can be generated if such an elapsed time exceeds predefined threshold amounts, thereby enabling servicewide disruptions to be detected across multiple microservices. Each microservice can optionally provide contextual information which can be maintained in a manner similar to the workflow graph, with independently addressable execution units executing state machines reflecting the values of key/value pairs utilized to specify contextual information. Metrics logged based on insight markers can optionally include such contextual information to enable further understanding and troubleshooting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
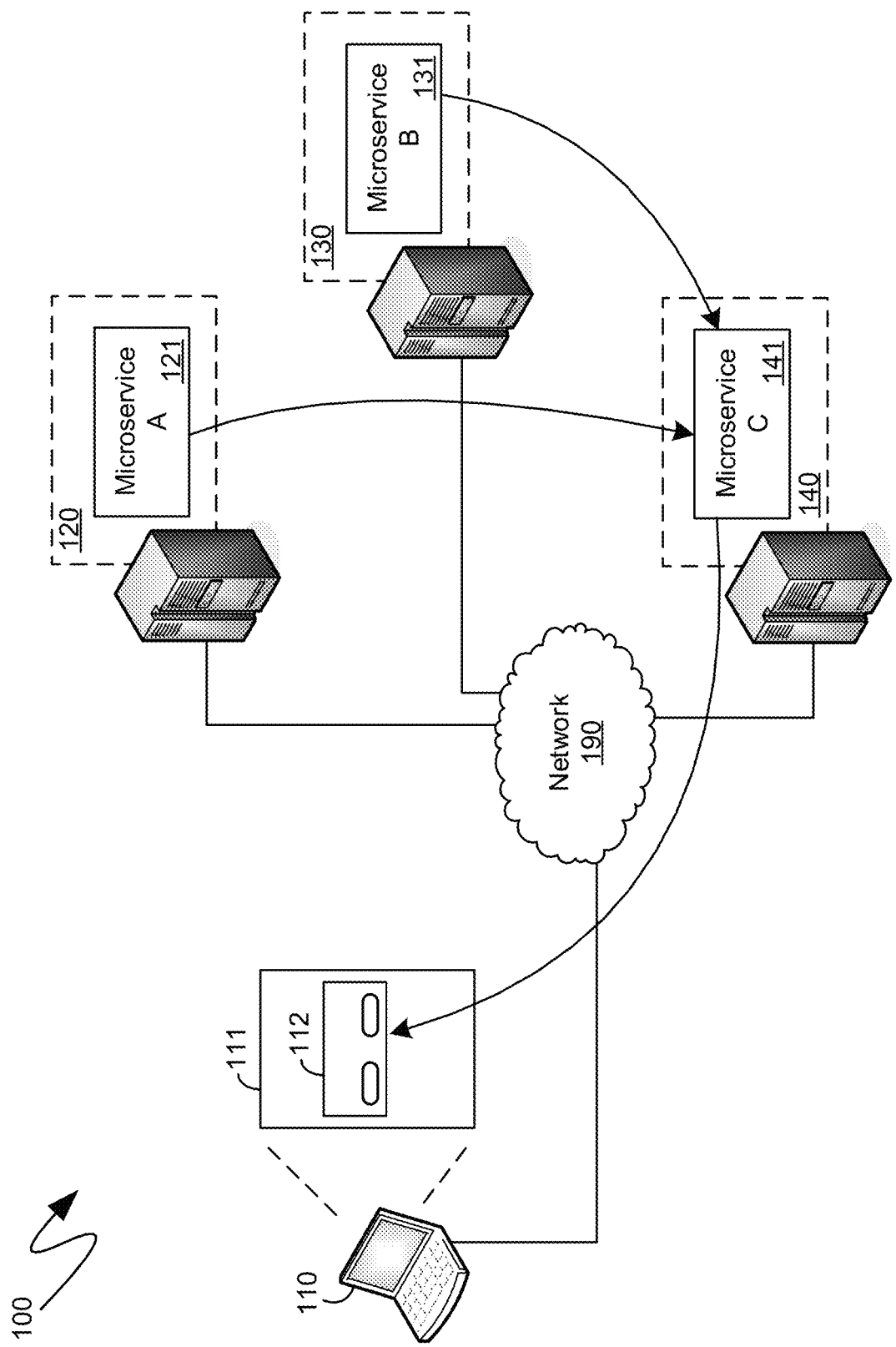
FIG. 1 is a system diagram of an exemplary system providing context for the descriptions below.

The following description relates to the quantification of the performance of computer functions implemented across multiple independent microservices by establishing a common schema utilized by each microservice to report events, generating and maintaining a workflow graph with separately addressable execution units each maintaining a state machine reflecting a state of either an entity or a process, and then utilizing the logged output of workflow graph changes to identify insight triggers, marking such triggers, and then generating metrics based on the differences, including elapsed time, between markers. A bipartite workflow graph, representing an understanding of an overall service, can comprise two different graph elements: entities and processes and each individual microservice can be allowed to define any of their logical constructs as either an entity or a process in accordance with a universal schema. Notifications from such microservices can conform to the universal schema, thereby enabling microservices to individually change how they operate internally, without affecting an understanding of the overall system as represented by the workflow graph. Each graph element can have its state maintained by a separately addressable execution unit executing a state machine, which can be individually updated based on information received from the microservices. Changes to the workflow graph can be logged and an insight engine can monitor such a log to insert insight markers in accordance with predefined events, thereby enabling the collection of metrics on a service wide basis and across multiple microservices. Metrics between start and end insight markers, such as an elapsed time between the start marker and the end marker, can be collected, including collected in real time, and can be logged for subsequent analysis, as well as utilized to trigger real-time notifications. Additionally, elapsed time since a start marker can be monitored and notifications can be generated if such an elapsed time exceeds predefined threshold amounts, thereby enabling servicewide disruptions to be detected across multiple microservices. Each microservice can optionally provide contextual information which can be maintained in a manner similar to the workflow graph, with independently addressable execution units executing state machines reflecting the values of key/value pairs utilized to specify contextual information. Metrics logged based on insight markers can optionally include such contextual information to enable further understanding and troubleshooting.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates an exemplary computing device 110 on which a user is executing an application, such as, for example, a cloud-based application, whose execution can comprise the obtaining of computer executable instructions from other computing devices over a network, such as the exemplary network 190. Such a cloud-based application can, for example, cause the exemplary computing device 110 to display a user interface, such as the exemplary user interface 111, which can, in turn, comprise a dialog box, such as the exemplary dialog box 112. The functionality offered to the user through the dialog box can be functionality that is implemented by multiple microservices. For example, microservice 121 can implement button functionality, that can manifest buttons on the user interface and receive user input through such buttons. As another example, microservice 131 can implement functionality to enable the user to enter a name of a document or file that the user wishes to save, as well as selecting a folder or other like storage location for the file or document. As a still further example, microservice 141 can implement functionality for actually receiving data and storing it in a specified location, such as on a server that is similarly communicationally coupled to the exemplary computer network 190. Each of the microservices 121, 131 and 141 can be executed on separate and independent computing devices, such as the exemplary computing devices 120, 130 and 140, respectively. Additionally, each of the microservices 121, 131 and 141 can be designed, programmed and implemented by independent teams, and each can utilize its own nomenclature, computer programming languages, data structures, programming paradigms and methodologies, and other like implementation mechanisms. As indicated previously, traditionally, to understand the performance of, for example, the exemplary dialog box 112, fragile mechanisms such as crawlers, or the utilization of tokens, were required in order to be able to span all of the microservices supporting the functionality of, for example, the exemplary dialog box 112.

According to one aspect, independent microservices, such as the exemplary microservices 121, 131 and 141, can utilize a common schema to report and log events occurring within each independent microservice. More specifically, all events within a microservice can be identified by four actions and two logical constructs and the schematized notifications can identify events within a micro service utilizing the four actions and two logical constructs. Logical constructs can be divided into either "processes" or "entities", with "processes" being logical constructs that perform actions and "entitles" being logical constructs that encompass either the data or functionality consumed by a process or the data or functionality generated by a process. As such two of the four actions include: (1) the generation of an entity, as output, by a process, or typically referred to as the entity being produced by the process, and (2) the consumption of an entity, as input, by a process. Two other actions can be defined to enable the specification of "intent", thereby enabling cross-process functionality to be monitored for successful completion. As a simple example, absent an ability to specify an intent, a process can consistently produce an entity and appear to be operating properly in the sense that it is, in fact, outputting an entity, as opposed to, for example hanging, crashing, or otherwise not completing. However, the output entity may be an error notification. Absent the ability to specify an intent, it can be difficult to determine that the output entity, namely the error notification, is not the intended output of the process. However, if intent can be specified, such that the process, for example, intended to produce a different type of entity, then a comparison can be made between the type of entity intended to be produced, and the type of entity actually produced, in order to provide a metric as to whether the process is operating properly. Therefore, the other two of the four actions include: (3) an intent by a process to produce an entity (even those such an entity has not yet, in fact, been produced by that process) and (4) and intent by a process to consume an entity (even though such an entity may not have yet been produced by a downstream process and, thus, is, currently, unavailable for consumption).

Figure 2:
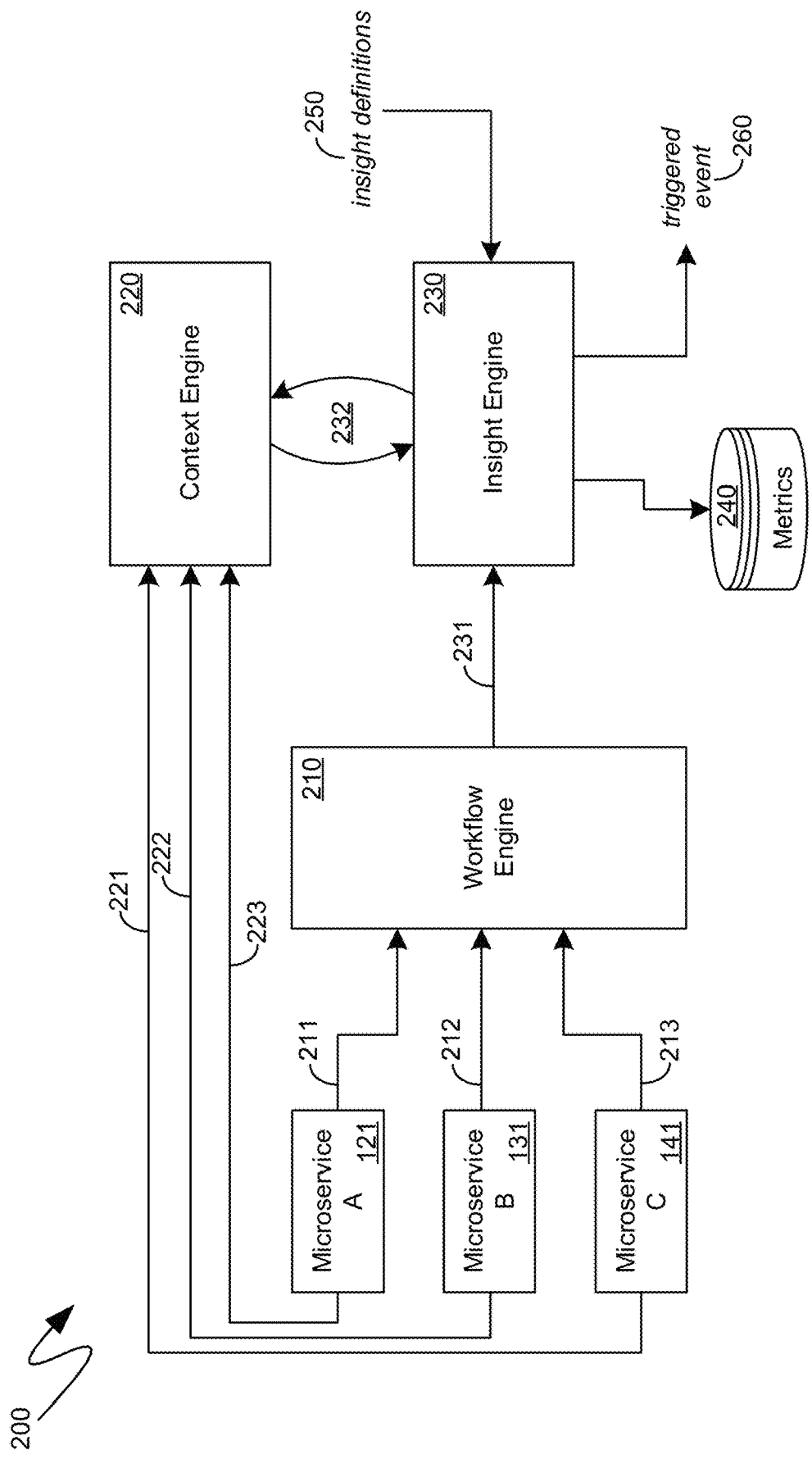
FIG. 2 is a system diagram of an exemplary system for quantifying compute performance across multiple independently executed microservices.

Turning to FIG. 2, the exemplary system 200 shown therein illustrates microservices, such as the exemplary microservices 121, 131 and 141, providing schematized notifications regarding events occurring within the independent exemplary microservices 121, 131 and 141 in the form of the exemplary communications 211, 212 and 213, respectively. Utilizing such schematized notifications, a workflow engine, such as the exemplary workflow engine 210 can generate and maintain a workflow graph that can be a conceptual representation of the linkages between entities and processes across multiple independent services, such as the exemplary microservices 121, 131 and 141. For example, the exemplary workflow engine 210 can receive a schematized notification from the microservice 121, such as via the communication 211, that can indicate that the microservice 121 has a process that intends to produce a specific entity that will be consumed by microservice 141. Analogously, workflow engine 210 can receive a schematized notification from the microservice 141, such as via the exemplary communication 213, that can indicate that the microservice 141 has a process that intends to consume a specific entity that will be produced by the microservice 121. In such an example, the microservice 121 and the microservice 141 have an already existing data contract between them in that the microservice 141 was designed to receive, and the microservice 121 was designed to output, an entity that conforms to some common data format that both the programmers of the microservice 121 and the programmers of the microservice 141 had to have agreed to in advance in order for the microservices to effectively communicate that entity between them. The mechanisms described herein leverage this common data contract, which, as indicated, already must exist in order for the microservices to function as expected. Thus, the mechanisms described herein do not suffer from the drawbacks of the prior art, including requiring a specific and extraneous token to be passed between the microservices. Instead, the common data contract between two microentities that is precondition to their interoperation is leveraged so that each microservice can be independently architected, and independently modified, while the schematized notifications of the present mechanisms ensure that the workflow engine 210 can continue to maintain the entity linkages between microservices. In such a manner, the workflow engine 210 can stitch together a workflow graph comprising identified entities and processes, with the edges between such entities and processes being one of: (1) a "produced" edge, signifying that an entity at which the edge ends was produced by a prior process at which the edge begins, (2) a "consumed" edge, signifying that an entity at which the edge begins was consumed by a subsequent process at which the edge ends, (3) an "intend to produce" edge, signifying that an entity at which the edge ends is intended to be, but has not yet been, produced by a prior process at which the edge begins and (4) an "intend to consume" edge, signifying that an entity at which the edge begins, once such an entity is actually produced, and, thus, comes into existence, a subsequent process at which the edge ends intends to consume that entity.

As the workflow engine 210 receives the aforementioned schematized notifications, it can update the workflow graph. In such a manner, changes to any one or more of the services, such as the exemplary microservices 121, 131 and 141, can be efficiently accommodated by the workflow engine 210 since any such changes will be reflected in the schematized notifications received from such microservices. The updates to the workflow graph can be generated in a log, or tickertape, format with each subsequent update simply being encoded or stored consecutively with a prior update. Such updates can be provided to an insight engine, such as the exemplary insight engine 230 shown in FIG. 2, and can be provided by communications between the workflow engine 210 and the insight engine 230, such as exemplary communications 231.

The insight engine 230 can additionally receive insight definitions, such as exemplary insight definitions 250. As utilized herein, the term "insight" means a specifically delineated functionality commencing with a defined starting event and concluding with a defined ending event, where such an ending event can be a programmed end or a failure, time-out or other like even that occurs prior to a programmed end but nevertheless serves as a boundary condition terminating the insight. Insights enable the collection of metrics, including performance metrics, across multiple independent services such as the exemplary microservices 121, 131 and 141. Insight definitions, such as the exemplary insight definitions 250, can specify specific events that can serve as a commencement point, or beginning, of a defined insight, and specific events that can serve as a termination point, or end, of that same insight. The insight engine 230 can then monitor the logged workflow graph changes generated by the workflow engine 210, and communicated to the insight engine 230 via the exemplary communications 231, and can, according to one aspect, annotate such logged workflow graph changes to identify insight starting and ending points. The insight engine 230 can, then, upon the completion of an insight, such as by its ending point having been identified within the logged workflow graph changes, collect metrics regarding such a completed insight. Such metrics can include any lapsed quantity of time between the beginning and ending of such an insight. Such a metric can enable the detection of performance or functionality issues across multiple independent services. Other metrics, such as memory consumption, network communication bandwidth consumption, and the like can also be collected for insights that have reached their identified ending point based on the logged workflow graph changes, as communicated to the insight engine 230 by the workflow engine 210.

The insight engine 230 can generate such insight metrics and can store such insight metrics in a metrics store, such as the exemplary metrics store 240. The metrics store 240 can be a database, a log file, or other like storage construct that can accumulate and maintain insight metrics previously generated by the insight engine 230. According to one aspect, in addition to storing generated insight metrics, such as for subsequent historical or trend analysis, the insight engine 230 can also trigger events that can be performed in real time, such as remedial events. For example, if an insight metric generated by the insight engine 230, upon completion of an insight, indicates that the insight took too long to complete, such as compared with a predetermined threshold elapsed quantity of time, which can have been provided by the corresponding insight definition, from among the insight definitions 250, the insight engine 230 can trigger a notification, such as to one or more administrators or service personnel. Such a notification can be one of the triggered events, such as exemplary triggered event 260, which can be triggered by the insight engine 230 upon detection of insight metrics exceeding predetermined threshold values.

In some instances, if a process has ceased proper operation, such as by crashing or hanging, it is possible that an ending event, defining an end of an insight, will never occur, or will occur far too late. To accommodate such instances, the insight engine 230 can also monitor metrics, such as elapsed time, since an insight commencing event. Consequently, even if a defined insight terminating, or ending, event never occurs, the insight engine 230 can detect when a metric, such as an elapsed amount of time since the beginning of the insight, has occurred. Such a detection, or determination, by the insight engine 230 can be utilized to trigger remedial action or other like triggered events 260.

To enable the insight engine 230 to provide additional information regarding the insight metrics it generates, the context engine, such as exemplary context engine 220, can maintain a context graph independently of the workflow graph maintained by the workflow engine 210. The insight engine 230 can then exchange communications with the context engine 220, such as the exemplary communications 232 shown in FIG. 2, and can, thereby, collect contextual information that can be added to insight metrics. Such contextual information can include information that will be useful in troubleshooting detected negative performance, as well as information that will be useful in analyzing historical metrics. For example, contextual information can include an identification of the computing hardware executing a particular process, a version, build number, or other like identification of the particular computer-executable instructions implementing the process, the values of one or more variables of specific entities, and other like contextual information. According to one aspect, such contextual information can be in the form of name/value pairs. In a manner analogous to that with which the workflow engine 210 maintains a workflow graph, the context engine 220 can maintain a context graph. The maintenance of such a context graph can include the receipt, by the context engine 220, of contextual information from services, such as the exemplary microservices 211, 212 and 213, which can provide contextual information to the context engine 220 via the exemplary communications 221, 222 and 223, respectively. The context engine 220 can then provide relevant contextual information to the insight engine 230, which can then be stored along with the relevant insight metrics, such as in the metrics store 240, or can be provided to triggered events, such as the exemplary triggered event 260. For example, metrics specifying a duration, or an elapsed time, of defined insights can also include contextual information indicating the type of computing hardware utilized to execute the underlying processes, and generate the underlying entities, of such insights. In such a manner, the performance of different types of computing hardware can be evaluated from historical insight metrics generated by the insight engine 230 in stored in the insight metrics store 240.

Figure 3:
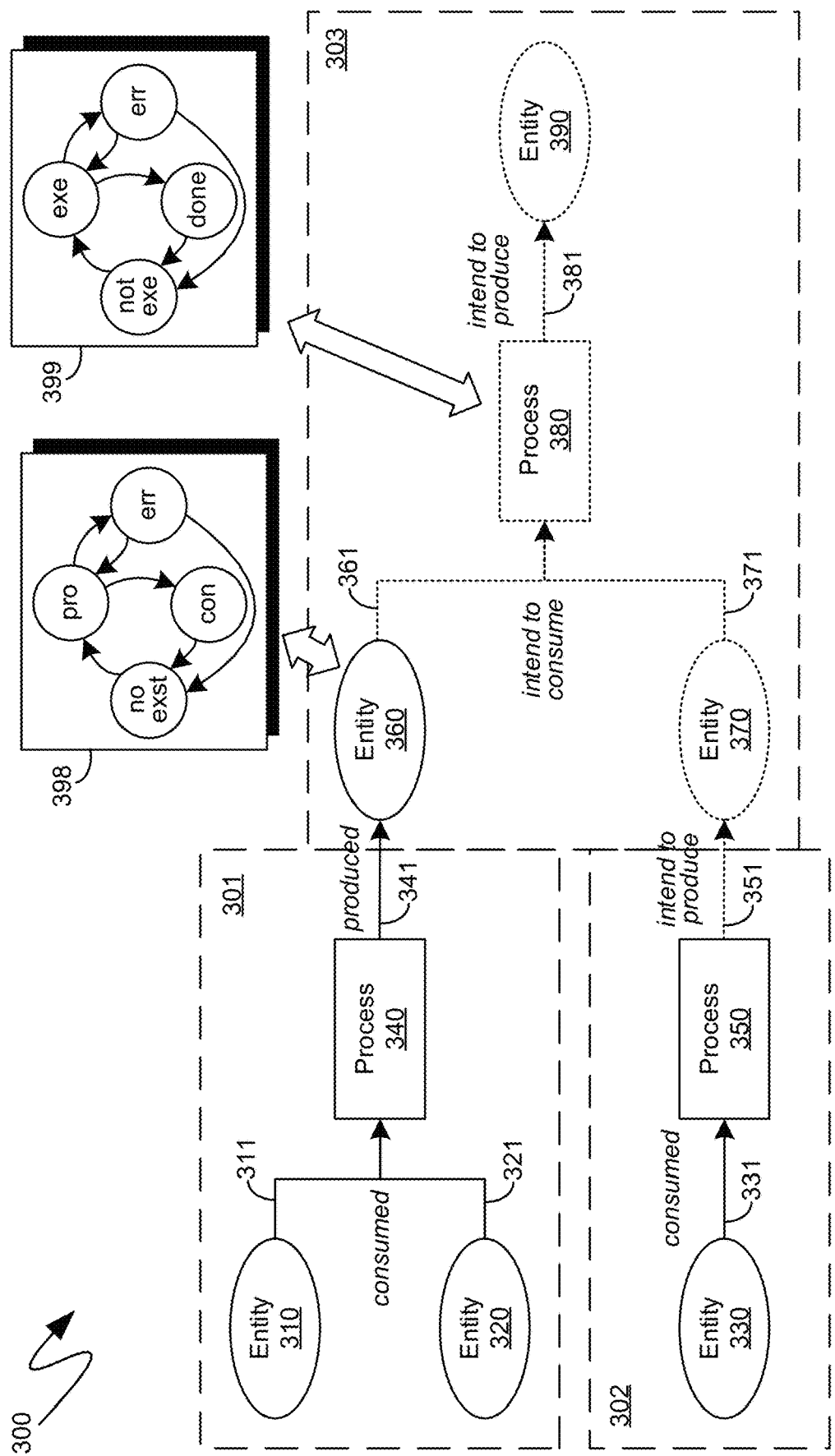
FIG. 3 is a block diagram of an exemplary workflow graph.

Turning to FIG. 3, the exemplary block diagram 300 shown therein illustrates an exemplary workflow graph maintained by the workflow engine 210, shown in FIG. 2. As indicated, the exemplary workflow graph comprises identifications of entities, of which a workflow engine was notified via one of the schematized notifications described previously, and further comprises identifications of processes, of which the workflow engine was also notified via a schematized notification, such as those described previously. Linkages, or edges, between the identified entities and processes can be one of: (1) a "produced" edge, signifying that an entity at which the edge ends was produced by a prior process at which the edge begins, (2) a "consumed" edge, signifying that an entity at which the edge begins was consumed by a subsequent process at which the edge ends, (3) an "intend to produce" edge, signifying that an entity at which the edge ends is intended to be, but has not yet been, produced by a prior process at which the edge begins and (4) an "intend to consume" edge, signifying that an entity at which the edge begins, once such an entity is actually produced, and, thus, comes into existence, a subsequent process at which the edge ends intends to consume that entity. A workflow graph, therefore, is the collection of linked together information regarding entities and processes of independently executing microservices.

For example, the exemplary workflow graph shown in FIG. 3 illustrates to entities, namely the exemplary entities 310 and 320, which are illustrated as being consumed by a process, namely the exemplary process 340, via the consumed edges 311 and 321, respectively. Such information can represent a conceptualization of the flow of information and processing within an independently executing microservice, such as the independently executing microservice 301, whose service boundary is illustrated in FIG. 3 by the dashed lines encompassing entities 310 and 320 and the process 340. Analogously, an exemplary independent executing microservice 302 can comprise an exemplary entity 330 being consumed by an exemplary process 350, as illustrated by the consumed edge 331.

For purposes of illustration, the processes 340 and 350 can, in turn, produce entities, such as the exemplary entities 360 and 370, which can be communicated from the independently executing microservices 301 and 302, respectively, to a new independently executing microservice, namely the exemplary microservice 303. In the exemplary workflow graph shown in FIG. 3, the exemplary entity 360 is illustrated is being produced by the exemplary process 340, as illustrated by the produced edge 341. The exemplary entity 370, however, is illustrated as only being intended to be produced by the process 350, as illustrated by the intend to produce edge 351. For example, the process 350 may not yet have been instantiated, by the microservice 302, to produce the entity 370. As another example, the process 350 may not yet have completed producing the entity 370. The intent to produce the entity 370, but the entity 370 not yet having actually been produced, is illustrated by short dashed lines.

In a similar manner, a process being executed by the microservice 303, such as, for example, the exemplary process 380, can be illustrated as intending to consume the entities 360 and 370, as illustrated by the intend to consume edges 361 and 371, respectively. As before, the process 380 may not yet have been instantiated and, as such, has not yet, in fact, consumed the entities 360 and 370. For example, the process 380 may not yet have been instantiated because the entity 370 has not yet been produced. The process 380, once executed, can intend to produce an output, conceptualized by the entity 390, which is linked to the process 380 via the intend to produce edge 381.

According to one aspect, each of the entities and processes in a workflow graph can be maintained by an independently addressable execution unit, such as an independently addressable process, subroutine, or other like collection of computer-executable instructions being executed to perform defined functionality. The independently addressable execution units can implement state machines that can represent a state of the corresponding process or entity. For example, an exemplary state machine 398 is illustrated as being maintained by an independently addressable execution unit corresponding to the entity 360. Such an independently addressable execution unit can be part of the workflow engine 210 shown in FIG. 2. For example, when the workflow engine initially receives a schematized notification that comprises an identification of the entity 360, such as an intend to produce notification indicating that the process 340 intends to produce the entity 360, the workflow engine can instantiate the independently addressable execution unit corresponding to the new entity 360 of which the workflow engine has now been made aware, and the state of the entity 360 can be appropriately represented by that independently addressable execution unit. For example, exemplary state machine 398 illustrates an exemplary "not existing" that can represent the state of the entity 360 when it has not yet been produced by the process 340.

Continuing with such an example, subsequent production of the entity 360, such as by the process 340 producing an output that is nominated as the entity 360, can result in the workflow engine instructing the separately addressable execution unit maintaining the state machine 398 to transition the state machine 398 to a "produced" state, for example. A subsequent consumption of the entity 360, such as by the exemplary process 380, can result in the workflow engine causing the independently addressable execution unit maintaining the state machine 398 to transition the state machine 398 to a "consumed" state, for example. Other states, such as an "error" state camp, likewise, be part of the state machine 398 that reflect the state of the entity 360.

In an analogous manner, one of the independently addressable execution units can maintain a state machine for, for example the process 380, as illustrated by the exemplary state machine 399. Thus, when a workflow engine receives a schematized notification, such as that details previously, indicating, for example, that a previously unidentified process intends to consume the entities 360 and 370, the workflow engine can update the workflow graph to create a process 380 linked to the entities 360 and 370 through the intend to consume links 361 and 371 and can instantiate an independently addressable execution unit to maintain the exemplary state machine 399 reflecting a state of the process 380. For example, upon instantiation, the independently addressable execution unit can initialize the exemplary state machine 399 to a "not executing" or "not instantiated" state, reflecting that the process 380 has not yet been invoked to consume the entities 360 and 370. Subsequently, when the workflow engine receives a schematized notification indicating that the process 380 has consumed the entities 360 and 370, the workflow engine can instruct the independently addressable execution unit to update the exemplary state machine 399 to, for example, an "executing" state, or a "completed" state. The exemplary state machine 399 can also comprise other states, such as an "error" state, into which the exemplary state machine 399 can be transitioned based upon schematized notifications received by the workflow engine.

According to one aspect, each update to a workflow graph, such as the updates implemented by the workflow engine, or the independently addressable execution units described above is being part of the workflow engine, can be logged or otherwise recorded. Such output can be consumed, reviewed, or otherwise utilized by an insight engine, such as exemplary insight engine 230 shown in FIG. 2.

Figure 4:
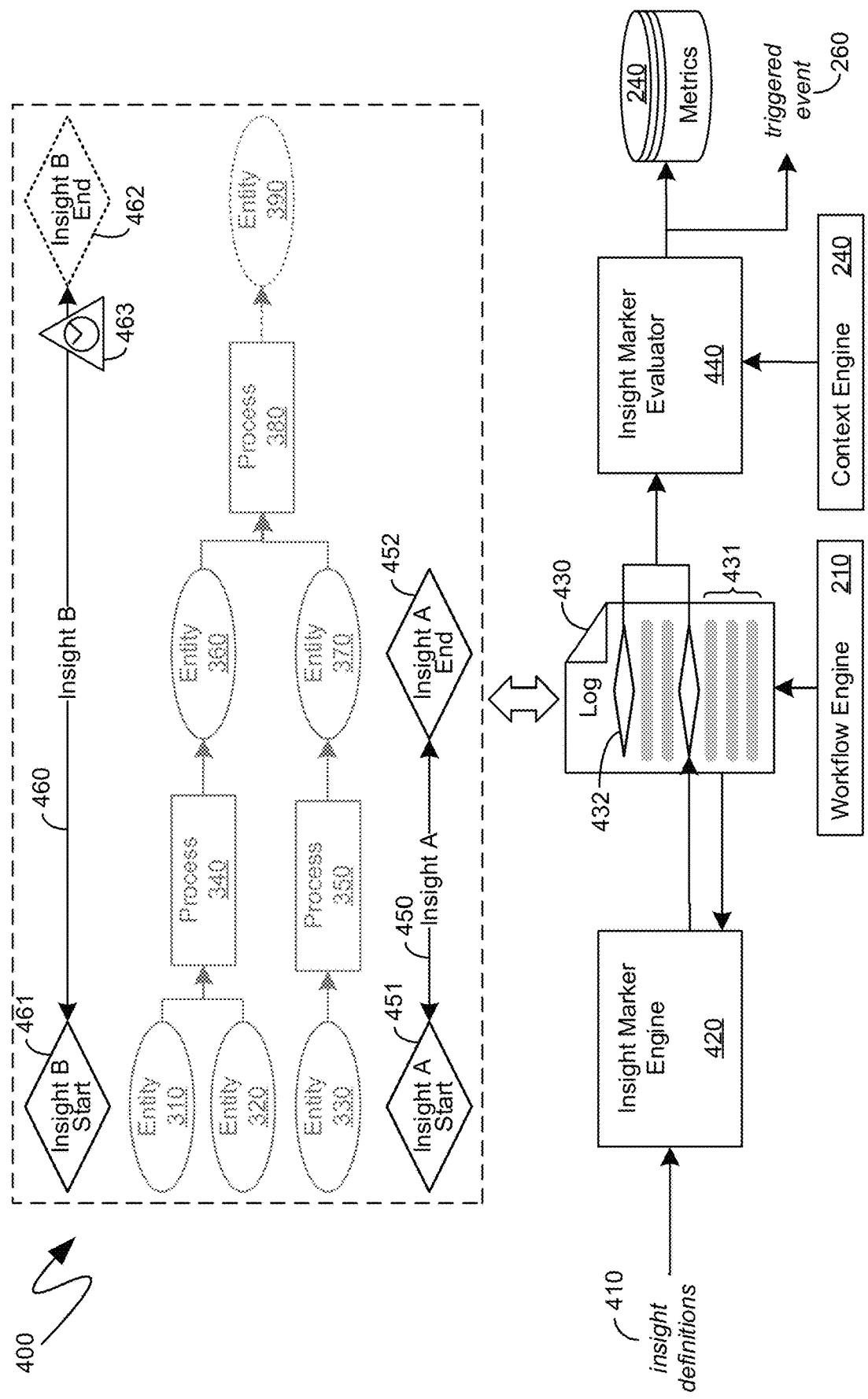
FIG. 4 is a system diagram of an exemplary marking of insights for quantification of compute performance across multiple independently executed microservices.

Turning to FIG. 4, and operation of an insight engine, such as the exemplary insight engine 230 shown in FIG. 2, is illustrated by the exemplary block diagram 400 shown therein. More specifically, an insight marker engine, such as exemplary insight marker engine 420, can receive insight definitions, such as exemplary insight definitions 410. An insight definition can comprise identification of boundary events, such as would be logged in the exemplary log 430 comprising changes to a workflow graph, such as those detailed previously. More specifically, one boundary event that can be identified by an insight definition can be a beginning event that can serve as a defined starting point of the insight for which metrics are sought to be collected. Another boundary event that can be identified by an insight definition can be an ending event that can be a defined ending point of the insight.

The exemplary insight marker engine 420 can then monitor the exemplary log 430, comprising log entries 431 of changes to the workflow graph, and generated by the exemplary workflow engine 210, such as described previously, and can insert within the log 430 insight markers, such as exemplary insight marker 432. The insertion of such insight markers can be more easily visualized within the context of the visualization of the workflow graph shown in FIG. 3, which is illustrated in the upper half a FIG. 4. For example, one insight can be defined by one of the insight definitions 410, to start when the entity 330 is created and end when the entity 370 is created. Such a simple insight can, for example, enable the measurement and determination of metrics regarding the operation of the process 350, including its consumption of the entity 330, and its production of the entity 370. Accordingly, the insight engine marker 420 can generate an insight marker 451 corresponding to the generation of the entity 330 when such a generation is detected via the logged workflow graph changes, such as the exemplary log events 431 in the exemplary log 430. Similarly, when the insight marker engine 420 detects the creation of the entity 370 it can insert an insight marker 452. The insight 450 can then be defined as delineated by the insight markers 451 and 452, as illustrated in FIG. 4.

An insight marker evaluator, such as the exemplary insight marker evaluator 440, can evaluate the insight markers inserted into the log 430, by the insight marker engine 420, and generate therefrom insight metrics which can be stored in the insight metrics store 240, and which can optionally trigger events, such as exemplary triggered event 260. For example, one metric that the insight marker evaluator 440 can determine can be an elapsed time between an insight start marker and an insight end marker. For example, a metric of insight 450 can be an elapsed time between the insight start marker 451 and the insight end marker 452, which the insight marker evaluator 440 can determine from the log 430. Such an elapsed time can then be recorded in the insight metrics store 240. Subsequently, other processes can obtain, from the insight metrics store 240 historical data providing the elapsed time of the execution of the process 350, as delineated by the relevant insight markers, as the process 350 is executed repeatedly over time.

In some instances it can be disadvantageous to wait for an insight to finish if a process encapsulated by the insight has failed, crashed, hung, or otherwise will not produce the expected output. For example, FIG. 4 illustrates another insight in the form of the exemplary insight 460. The exemplary insight 460 can have been defined by one of the insight definitions 410 to commence when, for example, the entity 310 is created, and to end when, for example, the entity 390 is created. As can be seen, the exemplary insight 460 enables the quantification of computer performance across multiple different services since, as illustrated in FIG. 3, the exemplary process 340 can be executed by one independently executing microservice while the process 380 can be executed by another, different, independently executing microservice. In such a manner, the workflow engine 210 can generate a workflow graph that can be utilized by the insight engine to quantify compute performance across multiple independently executing services.

However, if one of the process 340 or the process 380 crashes, for example, the entity 390 may never be produced, and the insight marker engine 420 may never insert the insight marker 462 signifying an end to the insight 460. Accordingly, according to one aspect, the insight marker evaluator 440 can monitor certain insights whose starting markers have been inserted into the exemplary log 430, even though such insights have not yet ended, as indicated by the insertion of an insight end marker, such as exemplary insight end marker 462. More specifically, the definitions of such insights can include an explicit instruction to the insight engine to monitor such insights and to generate notifications when a monitored metric exceeds a predetermined threshold, which can also be specified by the insight definition. For example, an insight definition for the insight 460, in addition to specifying the start of the insight 460, such as the creation of the exemplary entity 310, and specifying the end of the insightful and 60, such as the creation of the exemplary entity 390, can also specify that if an elapsed amount of time since the start of the insight 460 is greater than a specified threshold amount, then an alert for other like notification can be generated, which can be utilized to trigger events that can take remedial action, or other like triggered events 260. Within the exemplary workflow graph shown in FIG. 4, such a monitoring is illustrated by the time alert 463. More specifically, the insight marker evaluator 440 can monitor and elapsed amount of time since the insight marker 461 was inserted into the log 430 and, if that elapsed amount of time is greater than the threshold amount of time specified in the insight definition for the insight 460, the insight marker evaluator 440 and generated notification, which can trigger an event or remedial action, such as exemplary triggered event 260.

According to one aspect, notifications of insight metrics can comprise contextual information relevant to the insight. For example, the exemplary insight 450 can have metrics collected for such an insight evaluated in terms of the computer hardware executing the process 350, such as, for example, to facilitate determination of whether different types of computer hardware result in different execution metrics. As another example, such metrics can also be evaluated in terms of the version or build number of the computer executable instructions of which the process 350 is comprised, in order to determine, for example, if an updated build resolve the performance issue or design flaw in the process 350. To provide such contextual information the insight marker evaluator 440 can communicate with a context engine, such as the exemplary context engine 240, to receive therefrom contextual information relevant to the insight metrics being collected. According to one aspect, the context engine 240 can maintain a context graph in a manner similar to the workflow graph being maintained by the workflow engine 210, and, in response to queries from the insight marker evaluator 440, the context engine 240 can provide the relevant context based on the maintained context graph.

Figure 5:
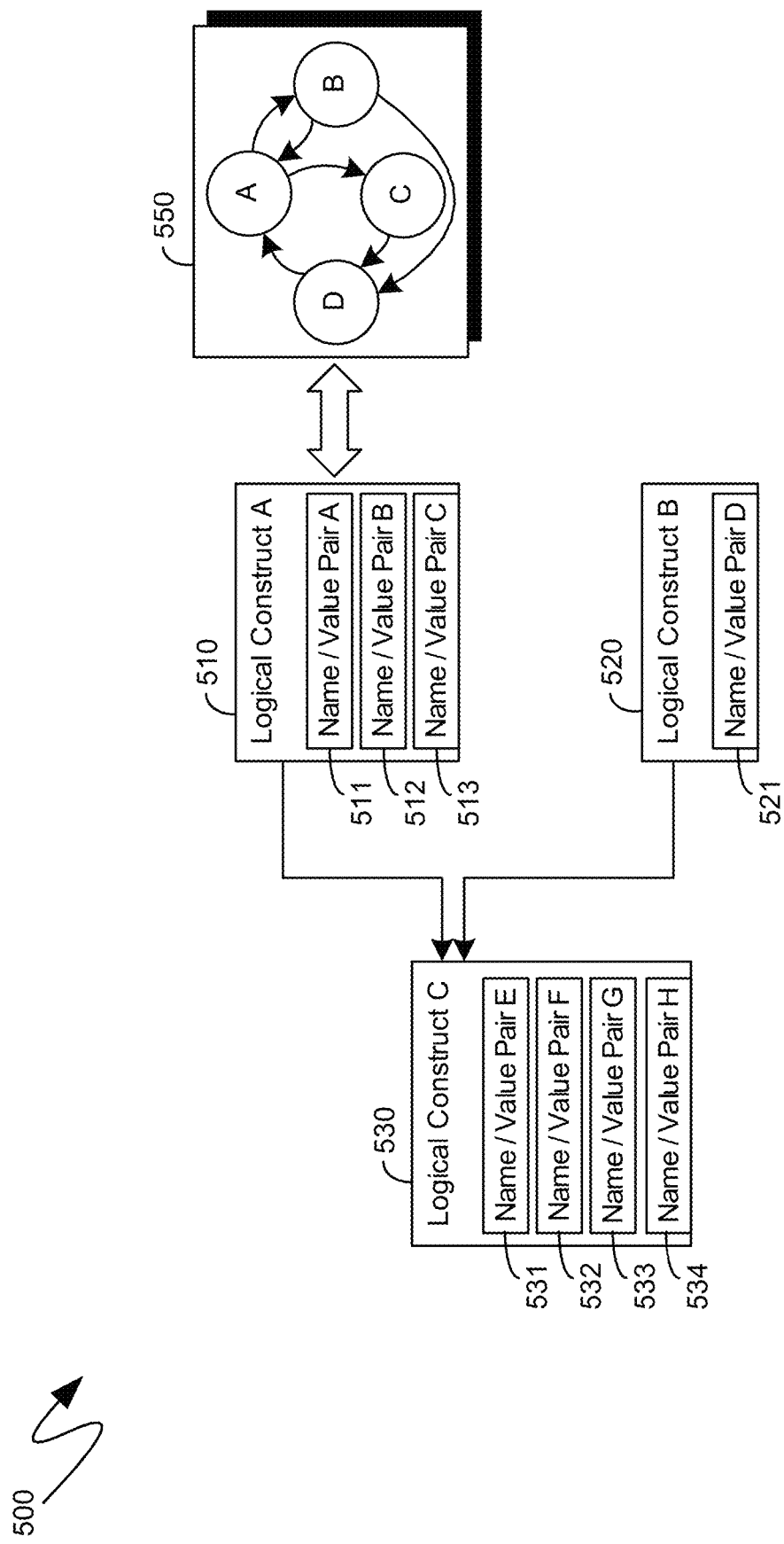
FIG. 5 is a block diagram of an exemplary context graph.

Turning to FIG. 5, the exemplary block diagram 500 shown therein illustrates an exemplary context graph, such as could be maintained by the context engine 240 shown in FIG. 2. Each microservice can provide to the context engine, such as in the manner illustrated in FIG. 2 and described in detail above, contextual information that would otherwise be excluded from the previously described workflow graph. Such information can be provided in the form of name/value pairs specifying an identification of the context and its corresponding contextual information. Such contextual information can include, as indicated previously, information regarding the computer hardware, processing capabilities, bandwidth, or other like hardware-centric context, as well as information regarding the version, build, programmer, source, or other like software-centric context. Such contextual information can be provided by the microservices for specific logical constructs such as entities, processes, subroutines, functions or combinations thereof. For example, one of the microservices can have provided contextual information about the logical construct 510 in the form of three name/value pairs, such as exemplary name/value pairs 511, 512 and 513. Such contextual information can further specify that the logical construct 510 is dependent upon, or otherwise associated with, another, different logical construct, such as exemplary logical construct 530. The logical construct 530 can be a different process, subroutine, function, or other like logical construct, including a logical construct that is maintained, or implemented, by a different microservice. The exemplary context engine can generate a context graph such as that illustrated, linking the logical construct 510 to the logical construct 530. Additionally, such as from that other, different microservice, the context engine can receive contextual information for the logical construct 530 such as, for example, contextual information the form of name/value pairs 531, 532, 533 and 534. In a similar manner or be associated with, the logical construct 530, in the context engine can generate a contextual graph representing such a linkage as well. For purposes of illustration the exemplary logical construct 520 can have contextual information associated with it in the form of a name/value pair 521.

As with the workflow graph, the exemplary context graph can be maintained by the context engine through separately addressable execution units that can implement a state machine, reflecting the state, or value, of each name/value pair. One such state machine, namely the exemplary state machine 550 is illustrated as being maintained for the exemplary name/value pair 511 by separately addressable execution unit. In such a manner, the context engine can simply reference the current version of the context graph when requested to provide context for one or more insights, such as by the insight engine.

Figure 6:
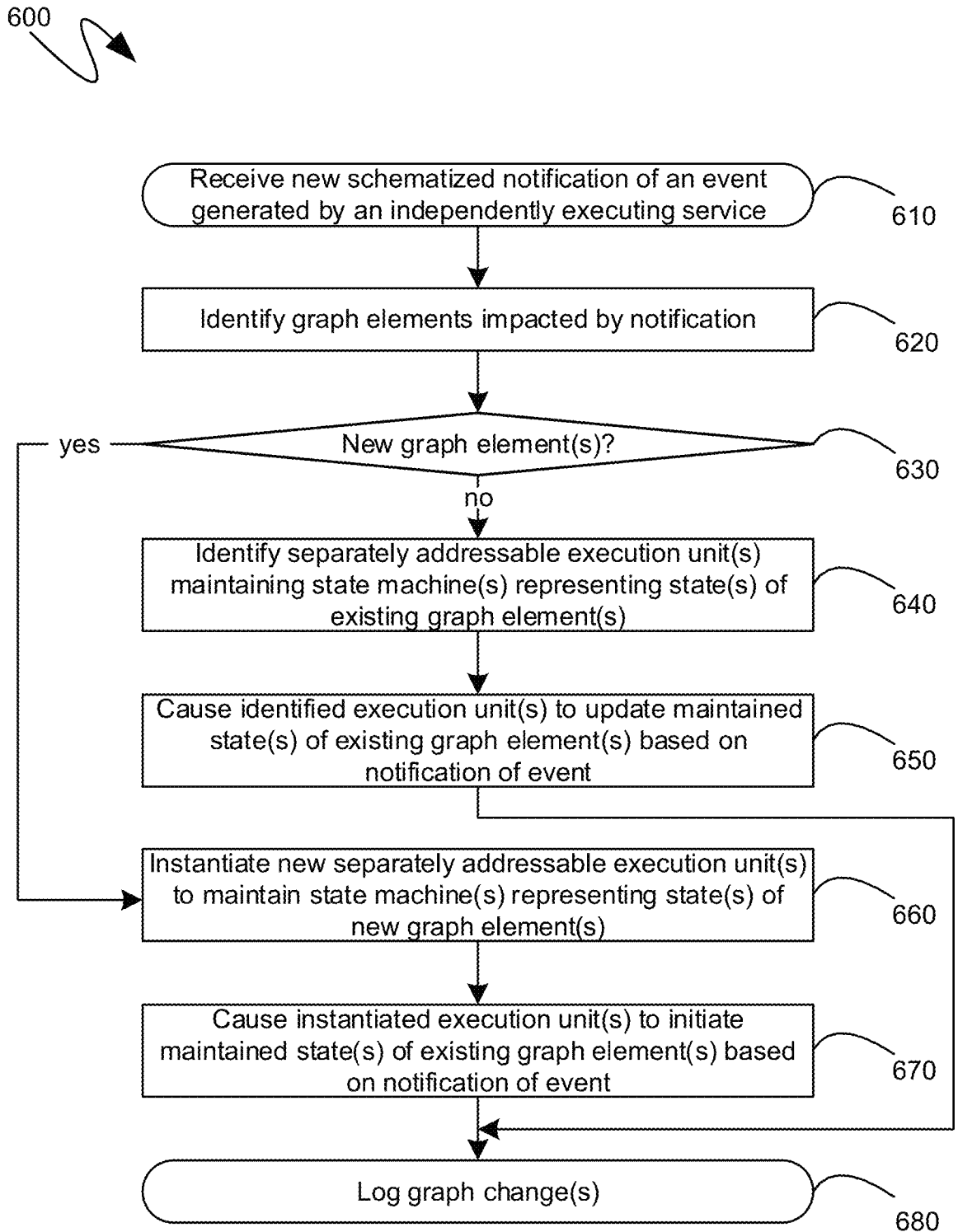
FIG. 6 is a flow diagram of an exemplary series of steps by a workflow graph can be maintained by separately addressable execution units implementing individual state machines.

Turning to FIG. 6, the exemplary flow diagram 600 shown therein illustrates an exemplary series of steps by which a workflow graph can be maintained in changes to the workflow graph logged. Initially, at step 610, a schematized notification of an event associated with the processing of computer-executable instructions providing an independently executing service can be received. At step 620, workflow graph elements, such as processes or entities, described in detail above, that are impacted by the notification received at step 610 can be identified. If the identified processes or entities, from step 620, our existing processes or entities that are already part of a maintained workflow graph, processing can proceed through step 630 to step 640 where the separately addressable execution units maintaining the state machines representing the states of those existing workflow graph elements can be identified. At step 650 the identified execution units can be triggered, instructed, or otherwise cause to update the maintained states of those workflow graph elements based on the notification received at step 610. Thus, for example, if the notification at step 610 indicates that an entity was produced, such as, for example, if such an entity is the output of a process or function, then, at step 650, the separately addressable execution unit maintaining a state machine reflecting the state of such an entity can be caused to update such state to indicate that the entity, which may previously have indicated the state of the entity as intended to be produced, to now reflect that the entity has, in fact, been produced. The relevant processing can then end with step 680 where such a change is logged.

Conversely, if, at step 630, it is determined that the workflow graph elements referenced by, or associated with, the notification received at step 610 have not yet been created within the workflow graph being maintained, processing can proceed to step 660 and new separately addressable execution units can be instantiated to maintain state machines representing the state of the newly identified workflow graph elements. Subsequently, at step 670, the newly instantiated execution units can be instructed, triggered or otherwise caused to initialize their respective state machines in accordance with an initial state corresponding to the workflow graph element. For example, if the notification, at step 610, indicated that an entity is intended to be produced, then the instantiated execution unit maintaining the state machine reflecting the state of such an entity can be caused, at step 670, to initialize such a state machine to a state reflective of the fact that the entity has not yet been produced. At step 680 the changes made to the workflow graph can be logged in the relevant processing can end until a new schematized notification is received.

Figure 7:
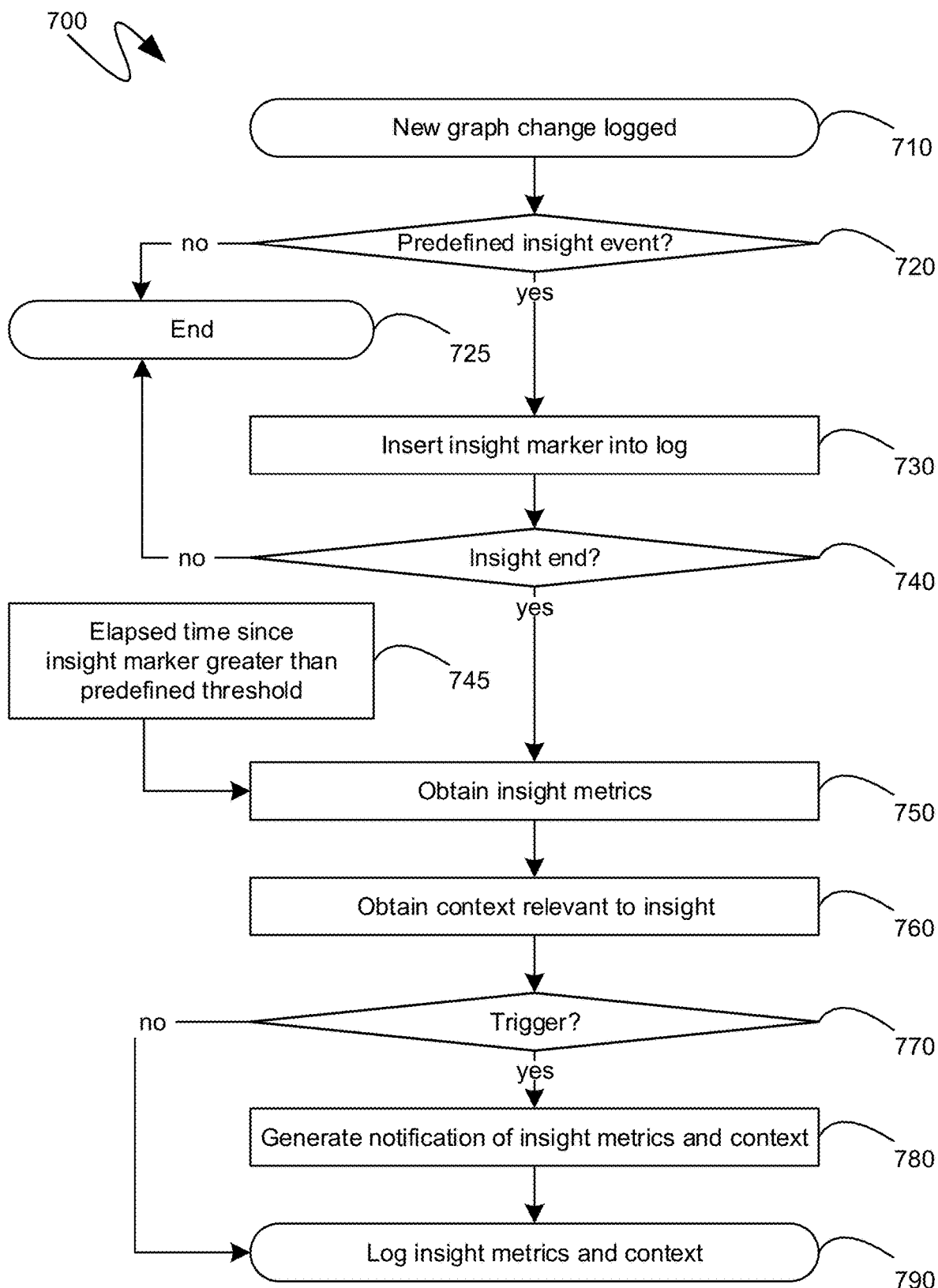
FIG. 7 is flow diagram of an exemplary series of steps by logs of workflow graph changes can be marked and metrics derived therefrom.

Turning to FIG. 7, the flow diagram 700 shown therein illustrates an exemplary series of steps by which compute metrics can be quantified across multiple independently executing processes. Initially, at step 710, a new log event in a log maintaining changes to a workflow graph, can be detected. Subsequently, at step 720, a determination can be made as to whether the logged event corresponds to an insight event as previously defined by an insight definition, such as in the manner detailed above. If the event logged at step 710 does not correspond to a previously defined insight event, the relevant processing can end at step 725. Conversely, if, at step 720, it is determined that the event logged at step 710 corresponds to a previously defined inside event, then an insight marker can be inserted into the log at step 730. At step 740, a determination can be made as to whether the insight marker that was inserted at step 730 signifies the end of an insight. If, at step 740, the insight marker inserted at step 730 is not an end marker, then the relevant processing can generate a started insight event, such as for prior subscriptions and subsequent historical analysis and then end at step 725. Conversely, if, at step 740, is determined that the insight marker inserted into the log at step 730 is an end marker, the processing can proceed to step 750.

At step 750, metrics associated with the insight can be obtained. For example, an elapsed time can be measured between when a beginning insight marker was inserted into the log and when the end marker was inserted into the log at step 730. Other metrics associated with the insight, such as a quantity of workflow graph changes occurring during the pendency of the insight, whether specific workflow graph changes occurred during the pendency of the insight, and other like metrics can likewise be obtained. At step 760, context relevant to the insight can be obtained, such as by requesting a current context from a context engine, including in the manner detailed above. If the requested context is not present, a missing context notification or insight event can be generated. At step 770, a determination can be made as to whether the obtained insight metrics, from step 750, and the obtained context, from step 760, are to be simply logged into an insight metrics log at step 790, which can serve as an end to the relevant processing until a new workflow graph change is logged, or whether an alert, or other like real-time notification is to be generated at step 780. The determination, at step 770, can be based on explicit instructions that can be part of an insight definition.

As detailed previously, in addition to the above-described steps, which can trigger the obtaining of insight metrics and context relevant to an insight when such an insight has ended, additional processing can, in parallel, also monitor the elapsed time since an insight start marker was added. If such an elapsed time is detected to be greater than a predefined threshold, where such a threshold can have been defined in an insight definition, the obtaining of insight metrics at step 750, and the obtaining of context relevant to the insight at step 760, can also be triggered by such an elapsed time detection step such as, for example, the exemplary step 745.

Figure 8:
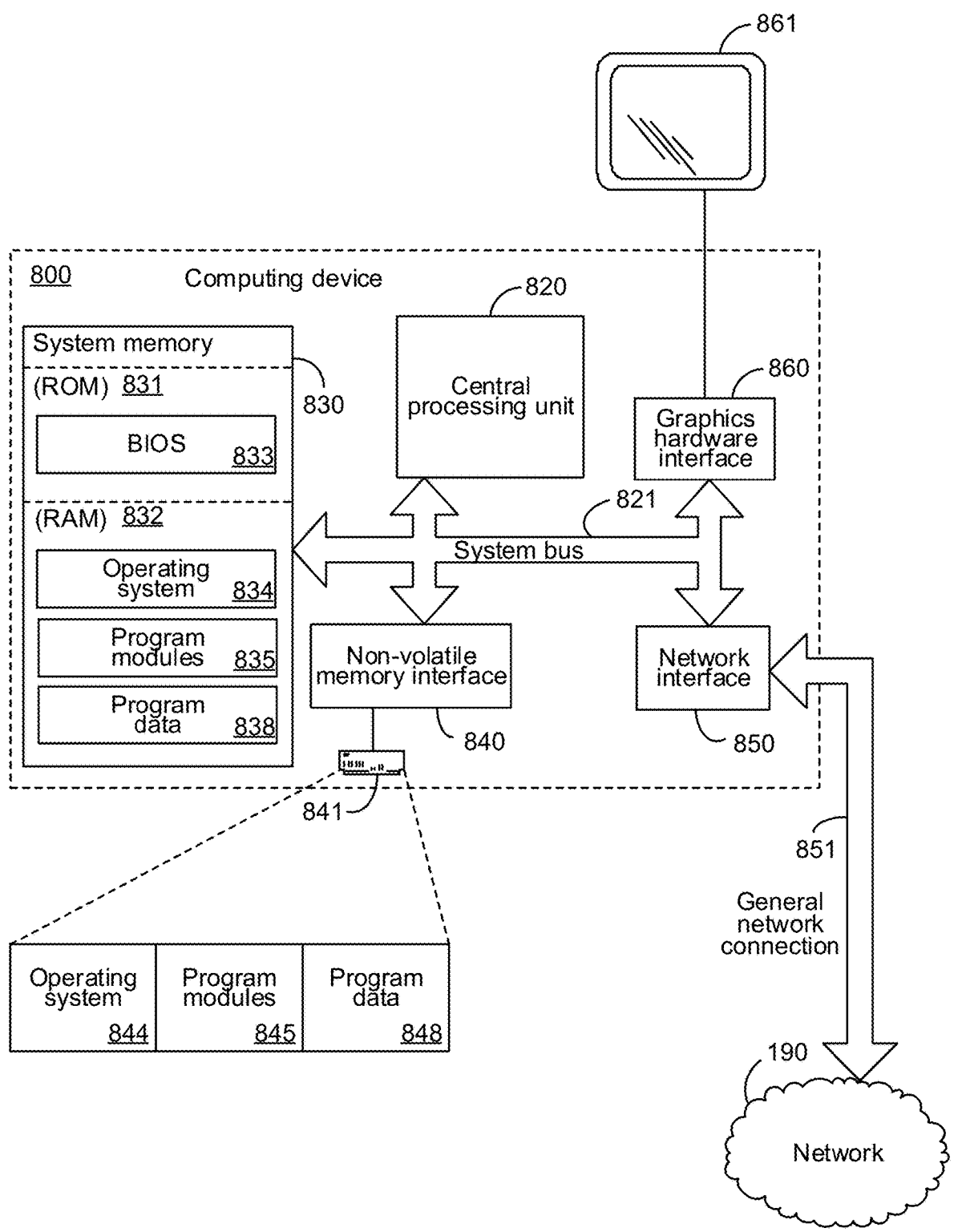
FIG. 8 is a block diagram of an exemplary computing device.

Turning to FIG. 8, an exemplary computing device 800 is illustrated which can perform some or all of the mechanisms and actions described above. The exemplary computing device 800 can include, but is not limited to, one or more central processing units (CPUs) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. The computing device 800 can optionally include graphics hardware, including, but not limited to, a graphics hardware interface 860 and a display device 861, which can include display devices capable of receiving touch-based user input, such as a touch-sensitive, or multi-touch capable, display device. Depending on the specific physical implementation, one or more of the CPUs 820, the system memory 830 and other components of the computing device 800 can be physically co-located, such as on a single chip. In such a case, some or all of the system bus 821 can be nothing more than silicon pathways within a single chip structure and its illustration in FIG. 8 can be nothing more than notational convenience for the purpose of illustration.

The computing device 800 also typically includes computer readable media, which can include any available media that can be accessed by computing device 800 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 800. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer content between elements within computing device 800, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, other program modules 835, and program data 836.

The computing device 800 may also include other removable/non-removable, volatile/nonvolatile computer storage media. By way of example only, FIG. 8 illustrates a hard disk drive 841 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 841 is typically connected to the system bus 821 through a non-volatile memory interface such as interface 840.

The drives and their associated computer storage media discussed above and illustrated in FIG. 8, provide storage of computer readable instructions, data structures, program modules and other data for the computing device 800. In FIG. 8, for example, hard disk drive 841 is illustrated as storing operating system 844, other program modules 845, and program data 846. Note that these components can either be the same as or different from operating system 834, other program modules 835 and program data 636. Operating system 844, other program modules 845 and program data 846 are given different numbers hereto illustrate that, at a minimum, they are different copies.

The computing device 800 may operate in a networked environment using logical connections to one or more remote computers. The computing device 800 is illustrated as being connected to the general network connection 851 through a network interface or adapter 850, which is, in turn, connected to the system bus 821. In a networked environment, program modules depicted relative to the computing device 800, or portions or peripherals thereof, may be stored in the memory of one or more other computing devices that are communicatively coupled to the computing device 800 through the general network connection 861. It will be appreciated that the network connections shown are exemplary and other means of establishing a communications link between computing devices may be used.

Although described as a single physical device, the exemplary computing device 800 can be a virtual computing device, in which case the functionality of the above-described physical components, such as the CPU 820, the system memory 830, the network interface 860, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 800 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a set of one or more computing devices, in aggregate comprising: one or more processing units; and one or more computer-readable media comprising computer-executable instructions which, when executed by the one or more processing units, cause the set of computing devices to: receive a schematized notification of a first event from an independently executing service, the schematized notification conforming to a universal predefined schema; instantiate a first separately addressable execution unit to maintain a first state machine corresponding to a state of a first process identified by the schematized notification of the first event if the first process was not previously identified by a previously received schematized notification, the independently executing service comprising the first process; cause the first separately addressable execution unit to update the first state machine in accordance with the received schematized notification if the first process was previously identified by the previously received schematized notification; instantiate a second separately addressable execution unit to maintain a second state machine corresponding to a state of a first entity identified by the schematized notification of the first event if the first entity was not previously identified by the previously received schematized notification, the first entity being either an input data or an output data of the first process; cause the second separately addressable execution unit to update the second state machine in accordance with the received schematized notification if the first entity was previously identified by the previously received schematized notification; and wherein the first event is one of: the first entity being produced by the first process; the first entity being consumed by the first process; a first intent specifying that the first process intends to produce the first entity; or a second intent specifying that the first process intends to consume the first entity.

A second example is the set of computing devices of the first example, wherein the first separately addressable execution unit updates the first state machine to transition from an intended state, indicating that the first process had not yet been instantiated by the independently executing service, to an existing state indicating that the first process has been instantiated by the independently executing service.

A third example is the set of computing devices of the first example, wherein the second separately addressable execution unit updates the second state machine to transition from an intended state, indicating that the first entity had not yet been created by the independently executing service, to an existing state indicating that the first entity has been created by the independently executing service.

A fourth example is the set of computing devices of the first example, wherein the one or more computer-readable media comprise further computer-executable instructions which, when executed by the one or more processing units, cause the set of computing devices to: generate a workflow graph comprising: a first graph element corresponding to the first process; a second graph element corresponding to the first entity; and a first graph edge between the first and second graph elements, the first graph edge being defined by the first event.

A fifth example is the set of computing devices of the first example, wherein the one or more computer-readable media comprise further computer-executable instructions which, when executed by the one or more processing units, cause the set of computing devices to: insert a first marker into a log listing updates to a workflow graph, the first marker being inserted with a first update to the workflow graph associated with the first event; insert a second marker in the log, the second marker being inserted with a second update to the workflow graph, the second update being logged after the first update and being associated with a second event occurring after the first event; generate a first notification comprising an elapsed time between the first marker and the second marker.

A sixth example is the set of computing devices of the fifth example, wherein the first notification triggers an alert regarding operation of the independently executing service.

A seventh example is the set of computing devices of the fifth example, wherein the first notification comprises storing the elapsed time into a historical metrics database.

An eighth example is the set of computing devices of the fifth example, wherein the first notification comprises contextual information of the independently executing service.

A ninth example is the set of computing devices of the eight example, wherein the one or more computer-readable media comprise further computer-executable instructions which, when executed by the one or more processing units, cause the set of computing devices to: receive a first key/value pair specifying a portion of the contextual information and hierarchical information associated with the first key/value pair; update a context graph to incorporate the first key/value pair in accordance with the hierarchical information; and provide the contextual information to be included as part of the first notification from the context graph.

A tenth example is the set of computing devices of the fifth example, wherein the one or more computer-readable media comprise further computer-executable instructions which, when executed by the one or more processing units, cause the set of computing devices to: detecting that an elapsed time since the first marker is greater than a specified threshold; and generating a second notification comprising the elapsed time since the first marker.

An eleventh example is the set of computing devices of the fifth example, wherein the one or more computer-readable media comprise further computer-executable instructions which, when executed by the one or more processing units, cause the set of computing devices to: receive a specification of an insight for which metrics are to be collected, the specification comprising: an identified starting event of the insight and an identified ending event of the insight; trigger the inserting the first marker based on a determination that the first event is the identified starting event of the insight; and trigger the inserting the second marker based on a determination that the second event is the identified ending event of the insight.

A twelfth example is a set of one or more computing devices, in aggregate comprising: one or more processing units; and one or more computer-readable media comprising computer-executable instructions which, when executed by the one or more processing units, cause the set of computing devices to: receive an insight definition comprising an identification of both a start event and an end event, the start event occurring within a first service and the end event occurring within a second service, wherein execution of the first service is independent of execution of the second service; monitor a log listing updates to a workflow graph, the workflow graph linking entities to processes that either consume or produce the entities through one of four linkings: (1) a production of an entity by a process, (2) a consumption of the entity by the process, (3) an intent by the process to subsequently produce the entity or (4) an intent by the process to subsequently consume the entity; determine that a first update to the workflow graph corresponds to the start event; insert a first start marker into the log with the first update in response to the determining that the first update corresponds to the start event; detect a second update to the workflow graph, subsequent to the first update, the second update corresponding to the end event; insert a first end marker into the log with the second update in response to the determining that the second update corresponds to the end event; and generate a first notification comprising an elapsed time between the inserted first start marker and the inserted first end marker.

A thirteenth example is the set of computing devices of the twelfth example, wherein the first notification triggers an alert regarding operation of at least one of the first service or the second service.

A fourteenth example is the set of computing devices of the twelfth example, wherein the first notification comprises storing the elapsed time into a historical metrics database.

A fifteenth example is the set of computing devices of the twelfth example, wherein the first notification comprises additional metrics of a first insight demarcated by the first start marker and the first end marker, the additional metrics quantifying aspects of at least one of entities or processes whose changes were logged between the first update and the second update in the log listing the updates to the workflow graph.

A sixteenth example is the set of computing devices of the twelfth example, wherein the first notification comprises contextual information of at least one of the first service or the second service.

A seventeenth example is the set of computing devices of the sixteenth example, wherein the one or more computer-readable media comprise further computer-executable instructions which, when executed by the one or more processing units, cause the set of computing devices to: receive a first key/value pair specifying a portion of the contextual information and hierarchical information associated with the first key/value pair; update a context graph to incorporate the first key/value pair in accordance with the hierarchical information; and provide the contextual information to be included as part of the first notification from the context graph.

An eighteenth example is the set of computing devices of the twelfth example, wherein the one or more computer-readable media comprise further computer-executable instructions which, when executed by the one or more processing units, cause the set of computing devices to: detecting that an elapsed time since the first start marker is greater than a specified threshold; and generating a second notification comprising the elapsed time since the first marker; wherein further the insight definition further comprises a specification of the specified threshold.

A nineteenth example is the set of computing devices of the twelfth example, wherein the one or more computer-readable media comprise further computer-executable instructions which, when executed by the one or more processing units, cause the set of computing devices to: receive a schematized notification of a first event from one of the first or second independently executing services, the schematized notification conforming to a universal pre-defined schema; instantiate a first separately addressable execution unit to maintain a first state machine corresponding to a state of a first process identified by the schematized notification of the first event if the first process was not previously identified by a previously received schematized notification, the independently executing service comprising the first process; cause the first separately addressable execution unit to update the first state machine in accordance with the received schematized notification if the first process was previously identified by the previously received schematized notification; instantiate a second separately addressable execution unit to maintain a second state machine corresponding to a state of a first entity identified by the schematized notification of the first event if the first entity was not previously identified by the previously received schematized notification, the first entity being either an input data or an output data of the first process; and cause the second separately addressable execution unit to update the second state machine in accordance with the received schematized notification if the first entity was previously identified by the previously received schematized notification.

A twentieth example is a method of quantifying compute performance across multiple independently executed services, the method comprising: receive a schematized notification of a first event from one of the multiple independently executed services, the schematized notification conforming to a universal predefined schema; instantiate a first separately addressable execution unit to maintain a first state machine corresponding to a state of a first process identified by the schematized notification of the first event if the first process was not previously identified by a previously received schematized notification, the one of the multiple independently executed services comprising the first process; cause the first separately addressable execution unit to update the first state machine in accordance with the received schematized notification if the first process was previously identified by the previously received schematized notification; instantiate a second separately addressable execution unit to maintain a second state machine corresponding to a state of a first entity identified by the schematized notification of the first event if the first entity was not previously identified by the previously received schematized notification, the first entity being either an input data or an output data of the one of the multiple independently executed services; cause the second separately addressable execution unit to update the second state machine in accordance with the received schematized notification if the first entity was previously identified by the previously received schematized notification; generate a log entry in a log, the log entry indicating a change to a workflow graph made by either: the instantiating the first separately addressable execution unit, the causing the first separately addressable execution unit to update, the instantiating the second separately addressable execution unit, or the causing the second separately addressable execution unit to update, the workflow graph linking entities to processes through one of four linkings: (1) a production of an entity by a process, (2) a consumption of the entity by the process, (3) an intent by the process to subsequently produce the entity or (4) an intent by the process to subsequently consume the entity determine that a first update to the workflow graph corresponds to a start event identified by an insight definition; insert a first start marker into the log with the first update in response to the determining that the first update corresponds to the start event; detect a second update to the workflow graph, subsequent to the first update, the second update corresponding to the end event; insert a first end marker into the log with the second update in response to the determining that the second update corresponds to the end event; and generate a first notification comprising an elapsed time between the inserted first start marker and the inserted first end marker, the elapsed time quantifying a subset of the compute performance across the multiple independently executed services.

As can be seen from the above descriptions, mechanisms for quantifying compute performance across multiple independently executed services have been presented. In view of the many possible variations of the subject matter described herein, we claim as our invention all such embodiments as may come within the scope of the following claims and equivalents thereto.

We claim:

1. A set of one or more computing devices, in aggregate comprising:
   one or more processing units; and
   one or more computer-readable storage media comprising
      computer-executable instructions which, when executed by the one or more processing units, cause the set of computing devices to:

receive a schematized notification of a first event from a service, the schematized notification conforming to a universal predefined schema;

update a first state machine in accordance with the received schematized notification, the first state machine corresponding to a state of a first process identified by the schematized notification of the first event, the service comprising the first process; and update a second state machine in accordance with the received schematized notification, the second state machine corresponding to a state of a first entity identified by the schematized notification of the first event, the first entity being either an input data or an output data of the first process;

wherein the first event is one of:

the first entity being produced by the first process;

the first entity being consumed by the first process;

a first intent specifying that the first process intends to produce the first entity; or a second intent specifying that the first process intends to consume the first entity.

2. The set of computing devices of claim 1, wherein the one or more computer-readable storage media comprise further computer-executable instructions which, when executed by the one or more processing units, cause the set of computing devices to:

generate a workflow graph comprising:

a first graph element corresponding to the first process;

a second graph element corresponding to the first entity; and a first graph edge between the first and second graph elements, the first graph edge being defined by the first event.

3. The set of computing devices of claim 1, wherein the one or more computer-readable storage media comprise further computer-executable instructions which, when executed by the one or more processing units, cause the set of computing devices to:

insert a first marker into a log listing updates to a workflow graph, the first marker being inserted with a first update to the workflow graph associated with the first event;

insert a second marker in the log, the second marker being inserted with a second update to the workflow graph, the second update being logged after the first update and being associated with a second event occurring after the first event; and generate a first notification based on a difference between the first marker and the second marker.

4. The set of computing devices of claim 3, wherein the first notification triggers an alert regarding operation of the service.

5. The set of computing devices of claim 3, wherein the first notification comprises contextual information of the service.

6. The set of computing devices of claim 5, wherein the one or more computer-readable storage media comprise further computer-executable instructions which, when executed by the one or more processing units, cause the set of computing devices to:

receive a first key/value pair specifying a portion of the contextual information and hierarchical information associated with the first key/value pair;

update a context graph to incorporate the first key/value pair in accordance with the hierarchical information; and provide the contextual information to be included as part of the first notification from the context graph.

7. The set of computing devices of claim 3, wherein the one or more computer-readable storage media comprise further computer-executable instructions which, when executed by the one or more processing units, cause the set of computing devices to:

receive a specification of an insight for which metrics are to be collected, the specification comprising: an identified starting event of the insight and an identified ending event of the insight;

trigger the inserting the first marker based on a determination that the first event is the identified starting event of the insight; and trigger the inserting the second marker based on a determination that the second event is the identified ending event of the insight.

8. The set of computing devices of claim 1, wherein the service executes the first process.

9. A set of one or more computing devices, in aggregate comprising:

one or more processing units; and one or more computer-readable storage media comprising computer-executable instructions which, when executed by the one or more processing units, cause the set of computing devices to:

monitor a log listing updates to a workflow graph, the workflow graph linking entities to processes that either consume or produce the entities through one of four linkings: (1) a production of an entity by a process, (2) a consumption of the entity by the process, (3) an intent by the process to subsequently produce the entity or (4) an intent by the process to subsequently consume the entity;

insert a first start marker into the log corresponding to a first update to the workflow graph;

insert a first end marker into the log corresponding to a second update to the workflow graph; and generate a first notification based on a first difference between the inserted first start marker and the inserted first end marker.

10. The set of computing devices of claim 9, wherein the one or more computer-readable storage media comprise further computer-executable instructions which, when executed by the one or more processing units, cause the set of computing devices to:

receive an insight definition comprising an identification of both a start event and an end event, the start event occurring within a first service and the end event occurring within a second service, wherein execution of the first service is independent of execution of the second service;

wherein the inserting the first marker into the log is based on determining that the first update to the workflow graph corresponds to the start event; and wherein further the inserting the second marker into the log is based on determining that the second update to the workflow graph corresponds to the end event.

11. The set of computing devices of claim 10, wherein the first notification comprises an alert regarding operation of at least one of the first service or the second service.

12. The set of computing devices of claim 10, wherein the first notification comprises additional metrics of a first insight demarcated by the first start marker and the first end marker, the additional metrics quantifying aspects of at least one of entities or processes whose changes were logged between the first update and the second update in the log listing the updates to the workflow graph.

13. The set of computing devices of claim 10, wherein the first notification comprises contextual information of at least one of the first service or the second service.

14. The set of computing devices of claim 13, wherein the one or more computer-readable storage media comprise further computer-executable instructions which, when executed by the one or more processing units, cause the set of computing devices to:
receive a first key/value pair specifying a portion of the contextual information and hierarchical information associated with the first key/value pair;
update a context graph to incorporate the first key/value pair in accordance with the hierarchical information; and
provide the contextual information to be included as part of the first notification from the context graph.

15. The set of computing devices of claim 10, wherein the one or more computer-readable storage media comprise further computer-executable instructions which, when executed by the one or more processing units, cause the set of computing devices to:
receive a schematized notification of a first event from one of the first or second independently executing services, the schematized notification conforming to a universal predefined schema;
update a first state machine in accordance with the received schematized notification, the first state machine corresponding to a state of a first process identified by the schematized notification of the first event, the one of the first or second independently executing services comprising the first process; and
update a second state machine in accordance with the received schematized notification, the second state machine corresponding to a state of a first entity identified by the schematized notification of the first event, the first entity being either an input data or an output data of the first process.

16. The set of computing devices of claim 9, wherein the first notification comprises storing the first difference into a historical metrics database.

17. The set of computing devices of claim 9, wherein the one or more computer-readable storage media comprise further computer-executable instructions which, when executed by the one or more processing units, cause the set of computing devices to:
detect that a difference between a current state of one or more of the entities or processes linked by the workflow graph and a state of the one or more of the entities or processes at the first start marker is greater than a specified threshold; and
generate a second notification based on the detecting.

18. The set of computing devices of claim 9, wherein the generating the first notification occurs in response to determining that the first difference exceeds a specified threshold.

19. The set of computing devices of claim 9, wherein the first difference comprises a difference between a state of one or more of the entities or processes linked by the workflow graph at the first start marker and a state of the one or more of the entities or processes at the first end marker.

20. A method of quantifying compute performance across multiple independently executed services, the method comprising:
receiving a schematized notification of a first event from one of the multiple independently executed services, the schematized notification conforming to a universal predefined schema;
updating a first state machine in accordance with the received schematized notification, the first state machine corresponding to a state of a first process identified by the schematized notification of the first event;
updating a second state machine in accordance with the received schematized notification, the second state machine corresponding to a state of a first entity identified by the schematized notification of the first event, the first entity being either an input data or an output data of the one of the multiple independently executed services;
generating a log entry in a log, the log entry indicating a change to a workflow graph, the workflow graph linking entities to processes through one of four linkings: (1) a production of an entity by a process, (2) a consumption of the entity by the process, (3) an intent by the process to subsequently produce the entity or (4) an intent by the process to subsequently consume the entity;
inserting a first start marker into the log corresponding to a first update to the workflow graph;
inserting a first end marker into the log corresponding to a second update to the workflow graph; and
generating a first notification based on a first difference between the inserted first start marker and the inserted first end marker, the first difference quantifying a subset of the compute performance across the multiple independently executed services.

* * * * *